United States Patent [19]

Holton

[11] Patent Number: 4,574,325

[45] Date of Patent: Mar. 4, 1986

[54] LIGHTNING PROTECTION ELECTRICAL CIRCUIT PATH FOR COUPLING BETWEEN AIRCRAFT STRUCTURES

[75] Inventor: Raymond G. C. Holton, Bothell, Wash.

[73] Assignee: The Boeing Company, Seattle, Wash.

[21] Appl. No.: 578,396

[22] Filed: Feb. 9, 1984

[51] Int. Cl.$^4$ .................................................. H05F 3/02
[52] U.S. Cl. ...................................... 361/218; 244/1 A
[58] Field of Search ........................ 361/218, 217, 216; 244/1 A; 174/2, 6

[56] References Cited

U.S. PATENT DOCUMENTS

| | | | |
|---|---|---|---|
| 1,543,131 | 6/1925 | Stough | 174/2 X |
| 3,159,943 | 12/1964 | Sugar et al. | 174/2 |
| 3,885,084 | 5/1975 | Kaiserswerth et al. | 174/35 GC X |
| 3,962,550 | 6/1976 | Kaiserswerth | 174/35 MS X |
| 3,989,984 | 11/1976 | Amason et al. | 361/218 X |

FOREIGN PATENT DOCUMENTS 2601277  7/1976  Fed. Rep. of Germany .

Primary Examiner—Reinhard J. Eisenzopf
Attorney, Agent, or Firm—Conrad O. Gardner; B. A. Donahue

[57] ABSTRACT

A method of providing lightning protection for non-metallic component structures, aircraft skins, etc. including sandwich-type skins on aircraft where fast removal and easy access is required between components of the lightning protection electrical circuit path. The electrical circuit path between aircraft structures utilizes a flexible clip not requiring fastener connection and removal when a component at the end of the circuit path is required to be replaced.

5 Claims, 13 Drawing Figures

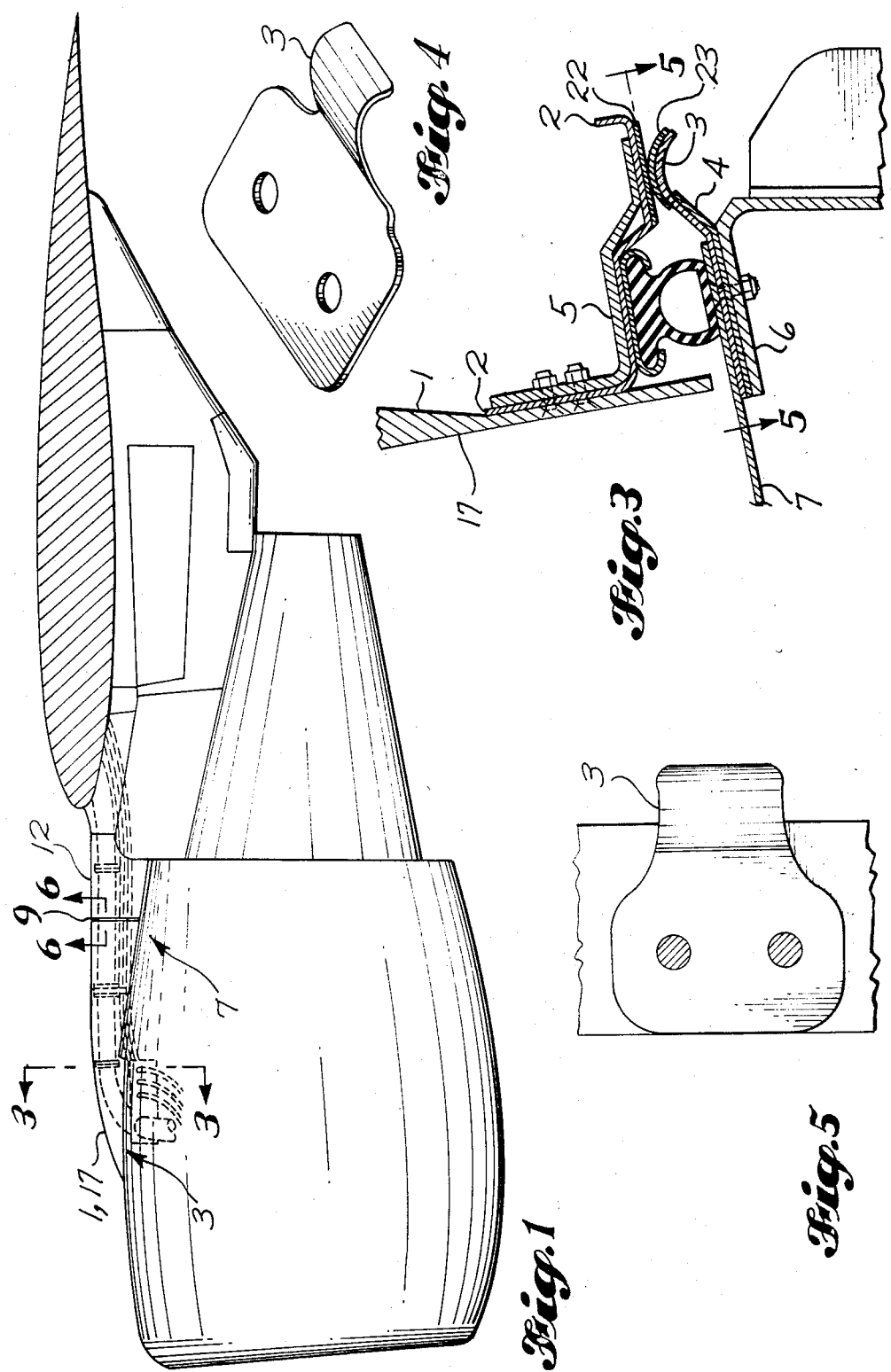

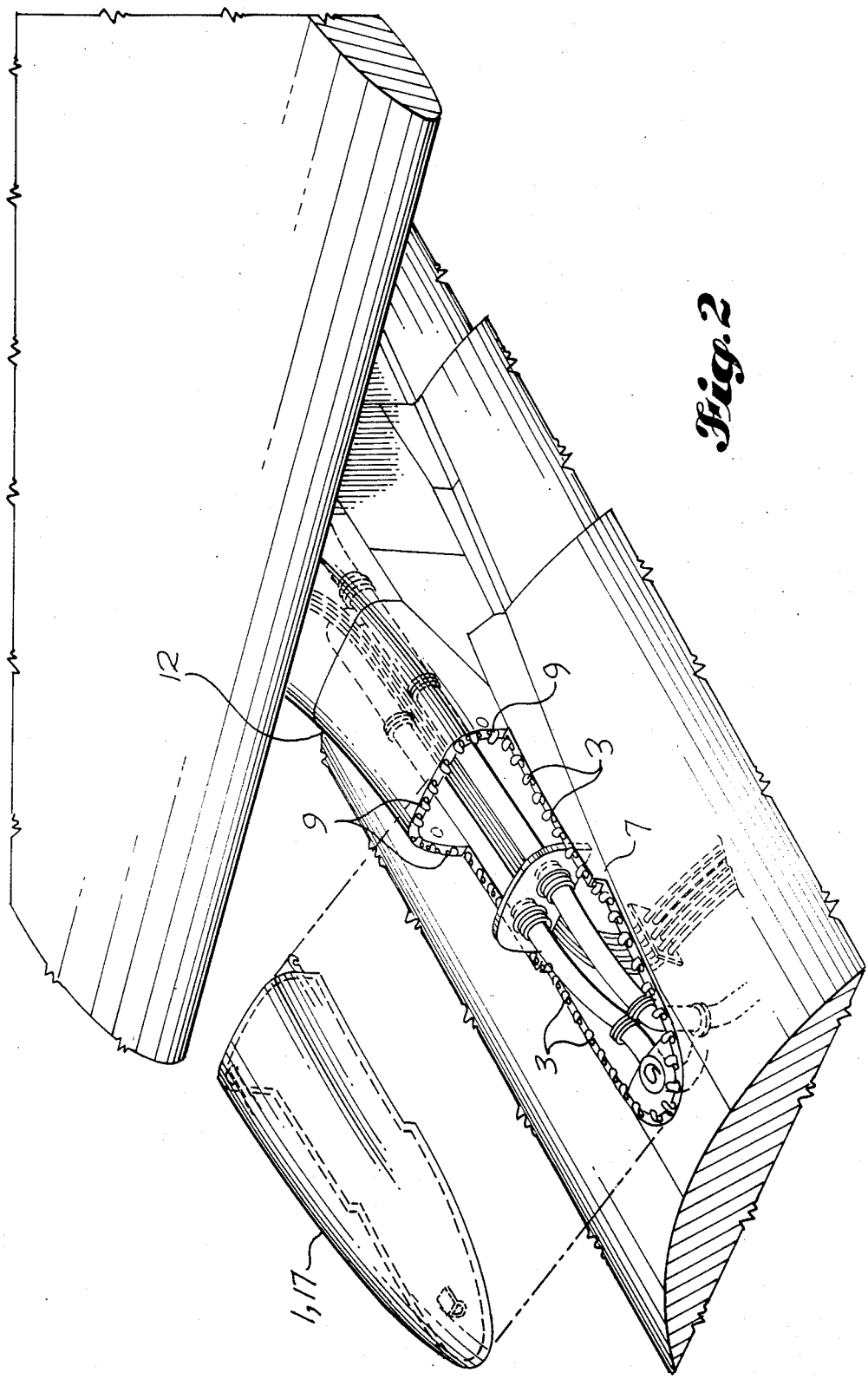

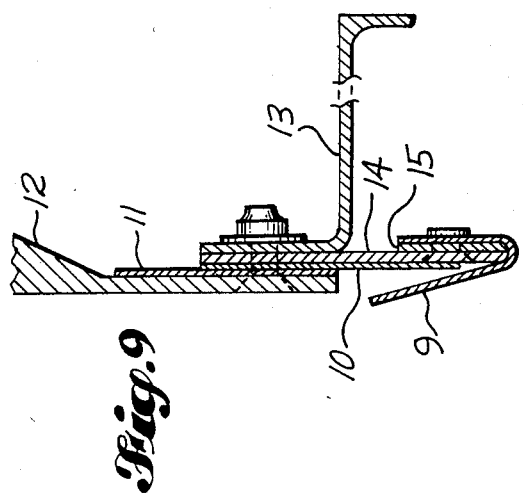
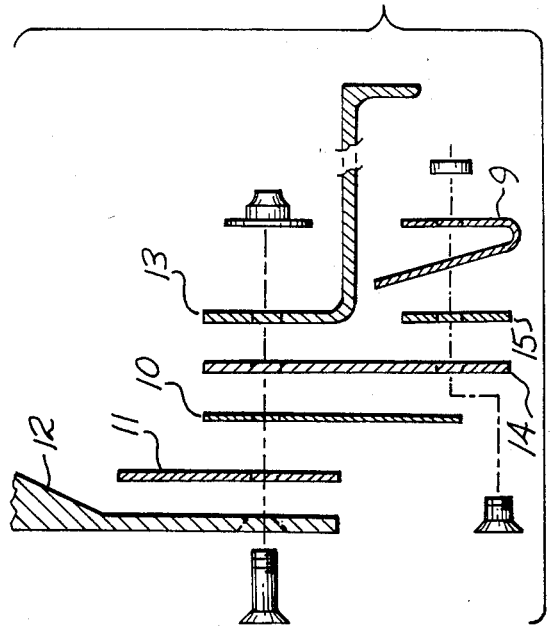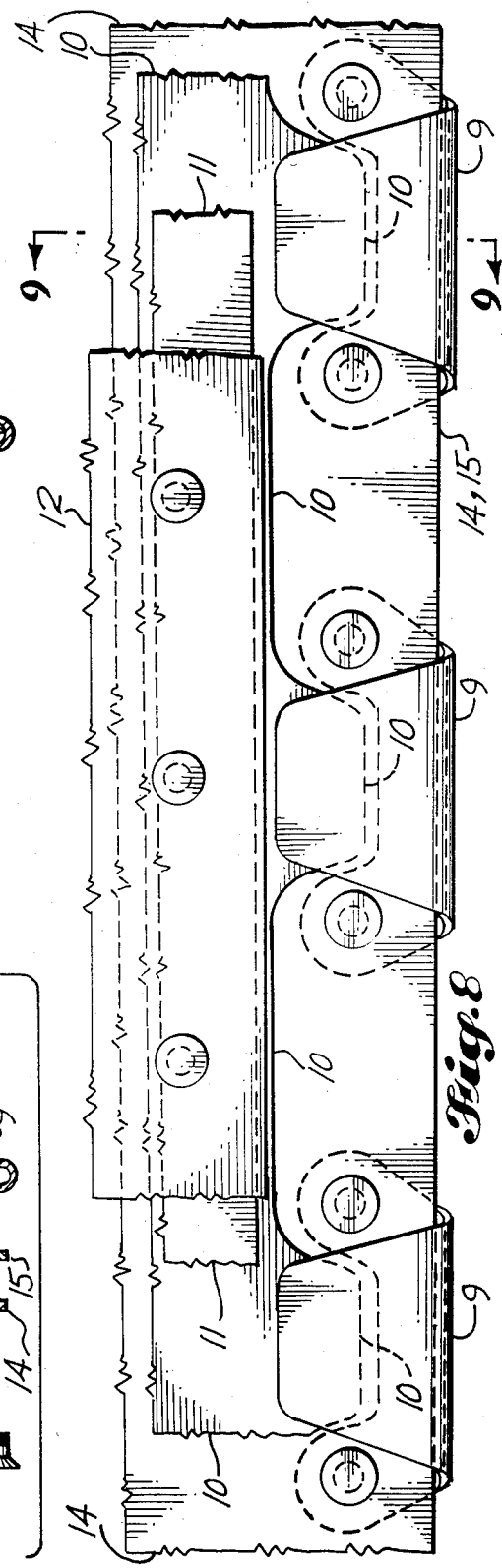

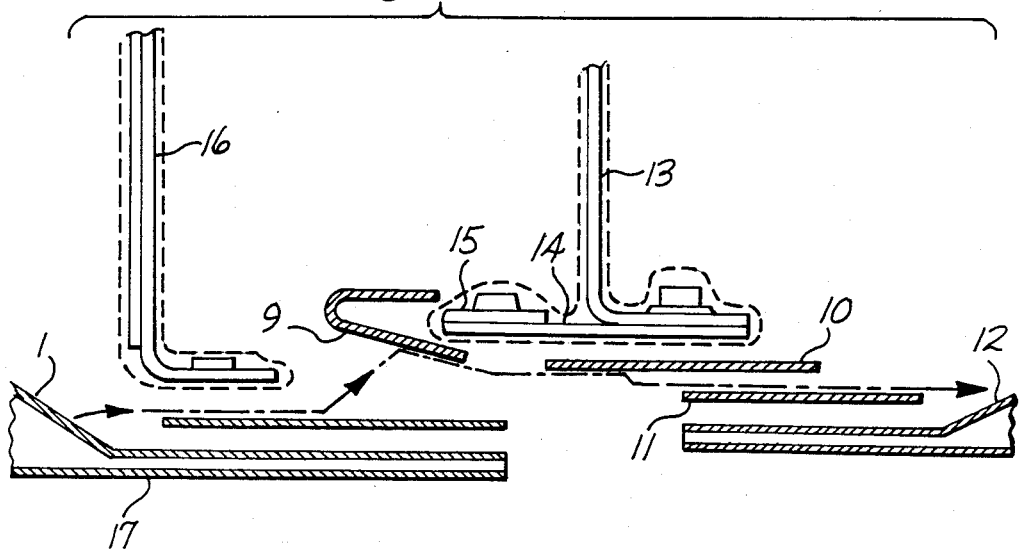
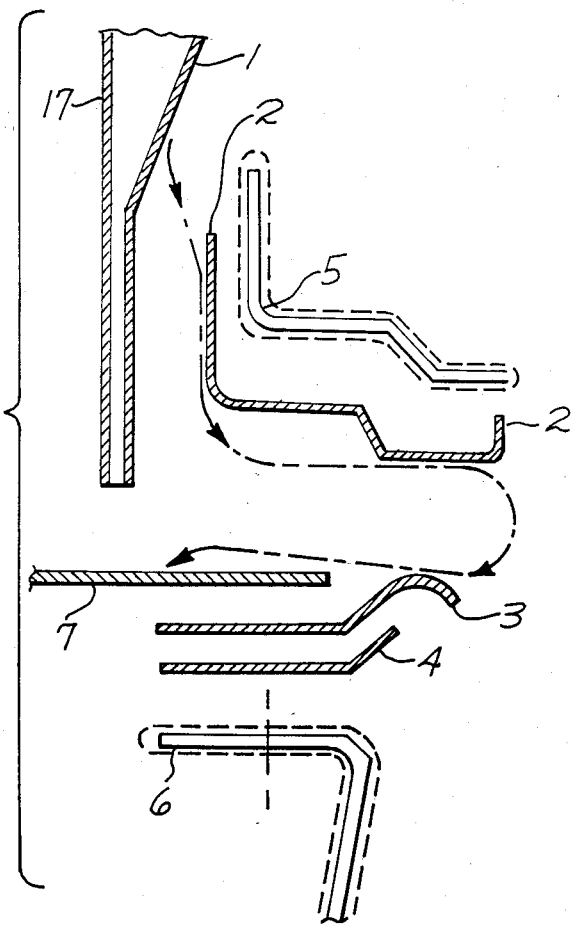

LIGHTNING PROTECTION ELECTRICAL CIRCUIT PATH FOR COUPLING BETWEEN AIRCRAFT STRUCTURES

The present invention relates to lightning protection for aircraft structures and more particularly to a lightning protection electrical circuit path for providing electrical conductivity between aircraft structures.

Clip-like structures for providing electrical conductivity between adjacent structures are known in the patent literature as exemplified by U.S. Pat. Nos. 3,885,084; 3,962,550; and German Pat. No. 2601277. Heretofore, prior art approaches to the problem of lightning protection have not been directed to electrical current path coupling protection between structures with recognition that the solution to the problem should also address the harsh and very variable atmospheric conditions that require extensive corrosion protection. Prior art approaches did not recognize at the same time, the variable contours and curved surface structural connections that were required in circuit path coupling between aircraft structures in the harsh environment. Prior art considerations further did not recognize that the electrical circuit path coupling for lightning protection should be suitable for coupling between interfaces at normal angles and also interfaces parallel to each other and also between interface structures which were removable one with respect to the other.

As a consequence of the preceding, preferred embodiments of the present invention utilize a grounding strip member electrically coupled to a first aircraft structural member, a grounding clip member electrically coupled to a further aircraft structural member, and tungsten carbide coatings on the contact faces between the grounding strip member and the grounding clip member.

A full understanding of the invention, and of its further objects and advantages and the several unique aspects thereof, will be had from the following description when taken in conjunction with the accompanying drawings in which:

FIG. 1 is a side view of an aircraft power pack and strut structure, detailing the areas around the forward or upper spar;

FIG. 2 is a isometric view of the power pack and strut shown in FIG. 1 further showing the removable access cover removed and unlatched from the main structure and interface;

FIG. 3 is a sectional view taken along the lines 3—3 of FIG. 1 showing a first embodiment of the present lightning protection electrical circuit path for coupling between aircraft structures wherein coupling is provided between the forward fairing and fan cowl support structures of FIGS. 1 and 2;

FIG. 4 is an isometric view of the metal ground clip member utilized in the lightning protection electrical current path for coupling between aircraft structures shown in FIG. 3;

FIG. 5 is a plan view of the metal ground clip member shown in FIG. 4;

FIG. 8 is a plan view of a plurality of metal ground clip members as shown in FIG. 7, however, distributed along the edge of a structural interface;

FIG. 9 is a section taken along the line 9—9 shown in FIG. 8 detailing the circuit path in a structural manner between aircraft structural components;

FIG. 10 is an exploded sectional view of FIG. 9 showing in more detail the actual components of the circuit path shown structurally in FIG. 9, thereby enabling a trace of the electrical current path in corrosion resistant steel through a component edge;

Figure 6:
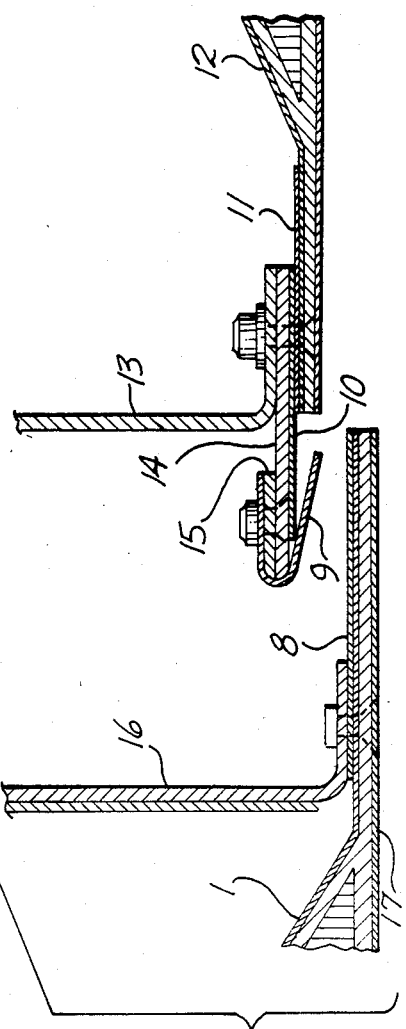
FIG. 6 is a section taken along the lines 6—6 of FIG. 1 showing a further embodiment of lightning protection electrical circuit path for coupling between aircraft structures where the edge is parallel to the structural interface in contrast to the embodiment of FIG. 3 where the edge is approximately normal or at an angle to the structural interface.

FIG. 12 is an exploded view of the lightning protection electrical current path denoted by arrows for coupling between aircraft structural members 1 and 12 as shown in the structural embodiment representation of FIG. 6; and, FIG. 13 is a lightning protection electrical current path diagram for coupling between aircraft structures 1 and 6 as shown in the structurally represented embodiment of the circuit path of FIG. 3.

Turning now to FIG. 3, it can be seen that lightning protection shielding layers on aircraft structural member 1, e.g. the forward fairing, make electrical contact from the external face to the internal surface through the permanent structural fasteners. The internal surface of structural member 1 makes electrical contact with grounding strip member 2. Grounding strip member 2 makes electrical contact with grounding clip member 3 comprising a gap-filling lightning protection clip. Grounding clip member 3 can be seen in FIGS. 4 and 5 to comprise a rectangular shaped base portion having two apertures therein for mounting to adjacent aircraft support structure, viz. fan cowl support member 6, the rectangular base support portion extending on one side thereof to provide a tongue-like flexible contact portion for flexed contact against grounding strip member 2. The interface surfaces on grounding strip member 2 and grounding clip member 3 (the tongue-like extended portion thereof) are provided with tungsten carbide coatings respectively 22 and 23. Tungsten carbide coatings 22 and 23 prevent wear and gauling. Gap-filling grounding clip member 3 has a thickness of about 0.016 inches. Grounding strip member 2 and grounding clip member 3 bridge the gap across the joint between structural members 1 and 6 thereby preventing electrical current jumping the gap and causing sparking and electrical current leakage to the inside region. Grounding clip member 3 and member 4 make electrical contact with supporting structural member 7, thereby completing the electrical and lightning protection circuit across the interface. Grounding strip member 2, grounding clip member 3, and member 4 comprise corrosion-resistant steel, viz. stainless steel, thereby preventing atmospheric corrosion but still providing a continuous bare metal electrical path for conductivity. Member 5 comprising the forward fairing angle, fan cowl support member 6, and member 7 comprising the fan cowl support skin are fully corrosion-resistant finished to protect against variable atmospheric corrosion elements over the aircraft lifespan. The aforementioned members 5, 6, and 7 are made of aluminum alloy material for the lightweight design requirements. Aluminum alloy corrosion occurs unless full corrosion protection is provided against atmospheric conditions to which the aircraft are subjected.

Turning now to FIGS. 3 and 6, it should be noted that grounding clip member 3 and grounding clip member 9, respectively, are the gap-filling lightning protection clip structures which are configured geometrically to permit them to be utilized on variable contured surfaces without the requirement of adapting the respective grounding clip members to fit the various contours of the many different aerodynamic geometric shapes in different applications of the present lightning protection electrical circuit path coupling structures.

Figure 7:
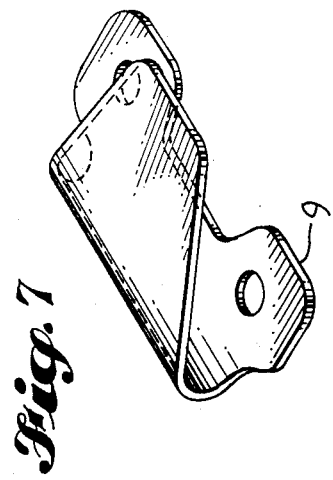
FIG. 7 is an isometric view of the metal ground clip member shown in the embodiment of FIG. 6.

Turning now to FIGS. 7 and 8, it will be noted that, in accordance with the second embodiment of the present lightning protection electrical circuit path for coupling between aircraft structures, the grounding clip member 9 (corresponding to grounding clip member 3 of FIG. 3) is U-shaped in that the elongated tongue-like portion extending from the base thereof is doubled back on itself with respect the the base portion and is similarly attached by two fasteners as shown in the base portion. Grounding clip member 9 performs a similar function as the aforementioned grounding clip member 3 of FIG. 3 in that, in the second embodiment of FIG. 9, grounding clip member 9 abuts grounding strip member 10 as seen in FIGS. 8, 9, and 10.

Referring now to FIG. 6, it will be noted that a similar grounding strip member 8 makes contact with structural member 1 as did grounding strip member 2 with forward fairing 1 in FIG. 3, grounding strip member 8 of FIG. 6 having a thickness of about 0.005 inches. Grounding strip member 8 of FIG. 6 makes electrical contact with U-shaped grounding clip member 9, thereby bridging the gap and providing electrical conductivity through the circuit path across the joint between the aircraft structural members 1 and 12 thus preventing current from jumping the gap and also preventing electrical current leakage to the inside surfaces and structure. The abutting surfaces of grounding strip member 8 and grounding clip member 9 are coated with tungsten carbide to prevent wear and gauling in the manner that the coatings 22 and 23, respectively, were applied to ground strip member 2 and grounding clip member 3 in the structure of FIG. 3. Grounding clip member 9 of FIG. 6 has a thickness of about 0.016 inches. Grounding clip member 9 makes electrical contact with member 10 which comprises the fixed fairing support structure, member 10 makes electrical contact with member 11 which comprises the fixed fairing panel. Member 11 makes electrical contact with member 12 which is the lightning protection layer and thereby providing the requisite electrical circuit path into the interfacing structure, viz. composite, sandwich panel, etc. Members 8, 9, 10, and 11 comprise corrosion-resistant steel, viz. stainless steel material, thereby preventing atmospheric corrosion but still providing a continuous bare metal electrical contact path. Members 13, 14, 15, and 16 comprise aluminum alloy material for lightweight design, thereby satisfying the minimum weight requirements for fuel economy of the aircraft. Further, members 13, 14, 15, and 16 are fully corrosion-resistant finished to thereby protect against variable atmospheric corrosion over the life span of the aircraft. Aluminum alloy thereby finished as members 13, 14, 15, and 16 do not provide an electrical current path, thereby restricting the electrical current path to the bare corrosion-resistant steel members hereinbefore described, viz. those comprising stainless steel.

Turning now to FIGS. 9 and, more particularly, 10 a comparison of, and illustration of the method of integrating coated aluminum structure with bare corrosion-resistant steel, viz. stainless steel, to provide a continuous electrical current path can be readily seen. In this regard, as previously noted, members 8, 9, 10, and 11 are made of corrosion-resistant stainless steel material and provide a continuous bare metal electrical contact path whereas as members 13, 14, 15, and 16, in contrast, are made of aluminum alloy material which is fully corrosion-resistant finished and which does not provide an electrical current path.

Figure 11:
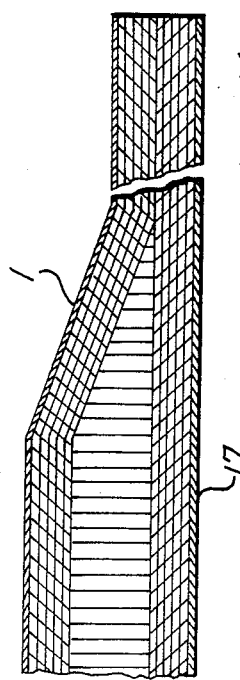
FIG. 11 is a sectional view of a typical composite sandwich panel edge showing lightning protection shielding layers on the internal face side and the external face side, thereby providing lightning protection shielding over both complete surface regions of the composite sandwich panel structure.

Layers 1 and 17 of the structure shown in FIG. 11 are shielding layers on the internal face side and also on the external face side of the composite sandwich panel or door structure shown. Layer 1, in the event of a composite structure constructed of non-metallic composite material, is an aluminum foil layer and, on a graphite composite structure, layer 1 comprises an aluminum foil layer with a fiberglass layer against the graphite. Layer 17 on the external face on a non-metallic composite material panel comprises a fiberglass weave coated with aluminum and in a graphite composite panel this same layer 17 requires a layer of non-metallic composite material between it and the graphite surface. (Aluminum corrodes when in contact with graphite and, therefore, the above requirements are necessary on a graphite composite panel.) Suitable coupling between such composite structures is shown in FIG. 6.

FIG. 12 is included as a circuit schematic showing current flow path represented by arrows through the lightning protection electrical current path coupling structure shown in FIG. 6 while FIG. 13 is representative of the current path flow through the lightning protection electrical current coupling structure shown in FIG. 3. Again, an understanding of the current flow, as indicated by the arrows, is had by an understanding of which elements are conductive and which elements are non-conductive in the complete coupling structure.

What is claimed is:

1. A lightning protection electrical current path for coupling between aircraft structures comprising:
    a first aircraft structure;
    a second aircraft structure;
    a grounding clip electrically conductively connected to said first aircraft structure;
    a grounding strip electrically conductively connected to said second aircraft structure;
    said grounding clip and said grounding strip comprising stainless steel; and,
    said grounding strip and said grounding clip having tungsten carbide coated interfacing and abutting surface portions.

2. The invention according to claim 1 wherein said grounding clip comprises a U-shaped member.

3. The invention according to claim 1 wherein said grounding clip comprises a rectangular shaped portion having a curved tongue portion extending from said rectangular shaped portion.

4. An electrical lightning connection device for providing an electrical current path between a plurality of aircraft structures, said connection device including a plurality of stainless steel elements and a plurality of corrosion-resistant aluminum alloy elements, said stainless steel elements having abutting tungsten carbide coated surface portions, said stainless steel elements comprising said electrical current path, and said plurality of corrosion-resistant aluminum alloy elements disposed relative to said stainless steel element for restricting said electrical current path to said stainless steel elements.

5. In combination, first and second aircraft composite structures; said first and second composite structures having an outer aluminum foil layer; a grounding strip electrically coupled to the said outer aluminum foil layer of said first composite structure; a grounding clip electrically coupled to the outer aluminum foil layer of said second composite structure; and, said grounding clip having a surface portion in circuit path with a surface portion of said grounding strip.

* * * * *